May 18, 1926.                                                 1,585,591
                          H. LÖWY
      MEANS FOR ELECTRIC PROOF AND MEASURING OF THE DISTANCE
                OF ELECTRICALLY CONDUCTIVE BODIES
                    Filed July 17, 1923         5 Sheets-Sheet 1

Inventor
H. Löwy
by Langner, Parry, Card & Langner
Attys.

May 18, 1926.
H. LÖWY
1,585,591
MEANS FOR ELECTRIC PROOF AND MEASURING OF THE DISTANCE
OF ELECTRICALLY CONDUCTIVE BODIES
Filed July 17, 1923    5 Sheets-Sheet 2

Inventor
H. Löwy
by Langner, Parry, Card & Langner
Attys.

May 18, 1926.
H. LÖWY
MEANS FOR ELECTRIC PROOF AND MEASURING OF THE DISTANCE
OF ELECTRICALLY CONDUCTIVE BODIES
Filed July 17, 1923      5 Sheets-Sheet 5

Inventor
H. Löwy
by Langner, Parry, Card & Langner
Attys.

Patented May 18, 1926.

1,585,591

UNITED STATES PATENT OFFICE.

HEINRICH LÖWY, OF VIENNA, AUSTRIA.

MEANS FOR ELECTRIC PROOF AND MEASURING OF THE DISTANCE OF ELECTRICALLY-CONDUCTIVE BODIES.

Application filed July 17, 1923. Serial No. 652,200.

My invention relates to means for electric proof and for the measuring of the distance of electric conductive masses, such as subterranean ore deposits and ground water and for the ascertaining of the height of flying vehicles, that is the distance of such vehicles from the electric conductive surface of the earth. Such means are based upon a principle which can be called the electric counterpart of the gearing method of Fizeau for the measuring of the velocity of the light. The difference resides in that instead of waves of light there are used electric waves and that instead of measuring the velocity of transmission, there is measured from the known velocity of the electric waves the unknown distance of the reflecting surface. For the toothed wheel which at Fizeau's experiment periodically uncovers and covers the source of light, I substitute according to my invention an arrangement which alternately puts the transmitter and the receiver out of action. Suppose the sender and the receiver are both connected with the same antenna, the antenna is acting as receiver of the waves which are sent out by itself. The arrangement can also be used for simultaneously sending and receiving.

The operation is as follows: During the (extremely short) time during which the sender is in action, there is sent out a wave train which is closely limited with regard to the time and which is returning to its starting point after reflection from any reflecting surface which may be anywhere existing. If the period of the alternating cutting out and inserting of the sender and the receiver are chosen just such that the front of the reflected wave is arriving just at the moment in the antenna when the sender is cut out and the receiver is inserted, then a maximum of the receiving action is obtained in the receiver.

Briefly stated, my invention relates to a method of and apparatus for, determining by means of electric waves the distance between the source of such waves and an electrically conductive surface serving as a reflecting surface for electric waves sent out by the said source and reaching the said conductive surface. My invention may be used for detecting underground electrically conductive surfaces or deposits such as of ores or water and for ascertaining the height of an air craft or balloon flying above the ground from the latter and for similar purposes.

In the drawings, all of which are diagrammatic.

Figure 1:
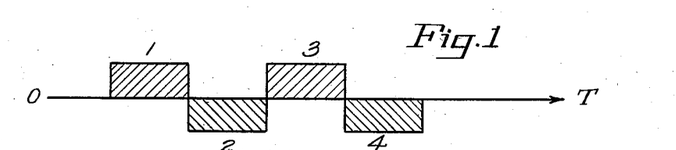
Figs. 1-3 are diagrams showing the principle of the method.
Figure 2:
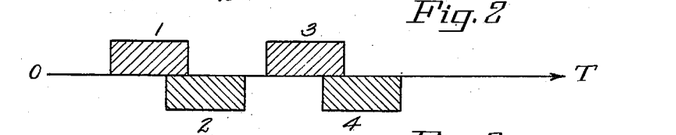
Figure 3:
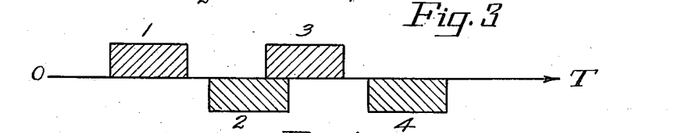

For clearly explaining the essence of my invention I shall first refer to Figs. 1 to 3 showing diagrammatically the time relation of sets of electric waves.

Assuming in the first place that sets of electric waves are intermittently emitted from some source in equal intervals of time in such a manner that a set of waves is emitted during a time interval $t$, at the end of this time interval $t$ the emission being interrupted for the same time interval $t$ and then taken up again for a time interval $t$ and so on. If then we plot the successive time intervals $t$ on the axis O, T Fig. 1, and represent the time intervals during which electric waves are emitted from their source by hatched rectangles above the axis O, T the operation of the transmitter of electric waves is represented by a series of such rectangles 1, 3 and so on, the front end of each such rectangles such as 1 being separated from the rear end of the next following hatched rectangle such as 3 by a distance equal in length to the bases of the hatched rectangles.

The intermittent sets of waves on reaching an electrically conductive surface are reflected whereby a series of intermittent sets of reflected waves are emitted from the said surface, and assuming the distance between the source of electrical waves and the reflecting surface to be constant, the sets of electric waves so reflected and reaching a suitable receiving apparatus in close proximity to the source of electric waves will be likewise intermittent and may be represented by hatched rectangles 2, 4, etc. below the line O, T, Fig. 1, the front end of one rectangle being separated from the rear end of the next following rectangle by a distance equal to the length of the rectangles corresponding to the time interval $t$. If now the distance between the source of electrical waves and the reflecting surface is $\frac{Ct}{2}$, C being the velocity of propagation of electric waves or of light and $t$ being properly selected, then at the very instant at which the emission of one set of waves ceases at the source of electric waves, receiving of the electric waves reflected by the conductive surface will begin in the receiving apparatus as is clearly indicated in Fig. 1, the right hand end of the rectangle 1 corresponding to the same value of time as the left hand end of the next following rectangle 2 and so on. If, however, the distance between the source of electric waves and the surface were less than $\frac{Ct}{2}$, then the left hand ends of the rectangles 2, 4 would corresponding to smaller values of time than the right hand ends of the next preceding rectangles 1, 3 as shown in Fig. 2, whereas if the distance between the source of electric waves and the reflecting surface were greater than $\frac{Ct}{2}$ the left hand ends of the rectangles 2, 4 would correspond to greater values of time than the right hand ends of the next preceding rectangles 1, 3.

I now bring the source of electric waves into such relation with the wave receiving apparatus adjacent thereto that at the very instant at which the wave emission from this source begins, the wave receiving apparatus is thrown out of action and is thrown into action again at the very instant when the wave emission from this source is interrupted. Consequently in Fig. 2 as well as in Fig. 3 the wave receiving apparatus will be operative only during the parts of the time intervals $t$ corresponding to parts of the rectangles 2, 4, not overlapped by the rectangles 1, 3. Therefore whether the distance between the source of waves and the reflecting surface is greater or less than $\frac{Ct}{2}$ the time intervals during which the receiving apparatus is operated are smaller than in the case Fig. 1 where this distance is equal to $\frac{Ct}{2}$ and all that is required is to use a wave receiving apparatus giving quantitative indications, that is to say indications which may be measured or nicely estimated and to make adjustable the frequency of the throwing into and out of operation of the wave emitting apparatus and to adjust this frequency so that the indication of the wave receiving apparatus which may be a telephone or a current measuring device reaches a maximum in order to realize the conditions indicated in Fig. 1. From the value of $t$ corresponding to this adjustment and from the known valve of C the distance sought may then be found.

In view of the extremely low values of $t$, that is to say of the extremely high frequency of the interruptions of the emission of waves from the source I make use of vacuum apparatus actuated by oscillations of adjustable frequency generated in what is called a modulation apparatus, the frequency of the modulation oscillations being only a small fraction of the frequency of the waves emitted by the source of waves and I provide means whereby e. g. the positive halves of the modulation oscillations throw into action the wave emitting source and out of action the receiver while the negative halves of the modulation oscillation throw out of action the valve emission of the source and into action the receiver.

This result may be arrived at by interposing between the modulation circuit and the wave generating circuit a vacuum tube acting as an electron switch, which responds to the direction of the halves of the modulation oscillations in such a manner that while the positive halves act on the switch, the wave generating circuit is closed, but the receiver circuit is open whereas the negative halves of the modulation oscillations act inversely, that is to say, break the wave emitting circuit and close the receiving circuit. Or I may impress on the vacuum tube forming part of a wave generating circuit with independent excitation, the modulation oscillations of which the voltage crest value is approximately equal to the constant grid voltage, so that the grid voltage varies between zero and twice the constant grid voltage, the constant grid voltage being so selected that its double value is beyond the saturation value of the tube. I prefer, however, to use electron switches as with them the sets of waves and the time intervals between successive sets of wave are more sharply defined and more reliably adjusted.

The means which I provide according to my invention consists of an aggregate of two transmitters (senders) and one receiver. The first transmitter has the purpose of sending out electric waves which have to be detected in the receiver after reflection upon any distant electric conductive masses. For this purpose the sender and the receiver are alternatingly and with variable frequency cut out and inserted by a second transmitter (sender) which is in the following called "modulation transmitter," in such a way that the receiver is never inserted before the sender oscillation is sufficiently died away. By this operation of the receiver which is besides withdrawn by decoupling to the direct influence of the sender oscillation (if no foreign senders are in action), only those waves are detected which have been reflected by electric conductive masses. For the transmission and for the reception different antennæ can be used or one and the same antenna.

The cutting out and the insertion have to take place in all practical cases in an exceedingly short time, for instance at a distance of the reflecting surface of 300 m. it has to take place within the 2,000,000th part of a second and at a distance of 3000 m. in the time of the 200,000th part of a second. It is impossible to effect such a quick cutting out or inserting by a mechanical interrupter. What is meant is that instead of using a mechanical interrupter, which owing to its great inertia would not be capable of following the rapid breakings and makings, which are required, I use according to my present invention an electron relay because the absence of inertia of the electrons enables the electrons to follow instantaneously even the deflections due to high frequency currents. The switching out or inserting is effected by the influencing of the electrons which are partly provided for the transmission and for the reception, and partly for the interruption. The influencing can be effected by electric oscillations (alternating current) by pulsating unidirectional current or by electric beats. The influence may either be a longitudinal or a transverse one, that is either in the direction of the movement of the electrons or transverse thereto.

Figure 4:
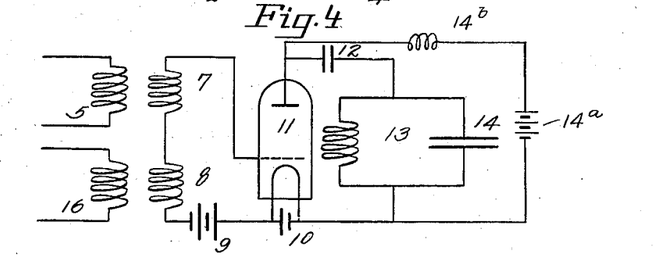
Fig. 4 shows an electrical connection for producing wave emissions of short duration.

In the following some special forms of execution of the means provided according to my invention are described:

Fig. 4 is the circuit diagram of a wave generating circuit with independent excitation, 13 is the self induction coil and 14 is the condenser of the wave generating circuit, 12 is a condenser and 11 the vacuum tube, the plate circuit of which has a choke coil 14$^b$ and a source of potential 14$^a$, 9 is a battery serving for impressing a constant voltage on the grid; 5, 6, 7 and 8 are coils, the coil 7 being inductively acted upon by the coil 5 of the transmitter F serving for independently exciting the wave generator and the coil 8 being inductively acted upon by the coil 6 of the modulation circuit. Neither circuits F and M are fully shown in Fig. 4 such circuits being well known in the art.

In Fig. 4 the grid voltage of the electron tube is varied periodically. The grid is influenced not only by the constant voltage of the battery but also by a foreign exciting sender F which serves for the exciting of the oscillations and the modulation transmitter M which serves for the purpose of rendering operative and inoperative the electron tube by properly varying the grid potential. For this purpose it is only necessary to so proportion the constant voltage impressed by a battery upon the grid that the same additional voltage due to the modulation transmitter which renders operative the transmitting electron tube renders inoperative the receiving electron tube and vice versa.

Instead of the grid voltage the anode voltage can also be influenced in such a way that a periodic cutting out and insertion of the oscillations in the sender or in the receiver takes place.

The modulation transmitter M also acts on the receiving tube so that when the one tube is thrown into operation the other tube is thrown out of operation.

Figure 5:
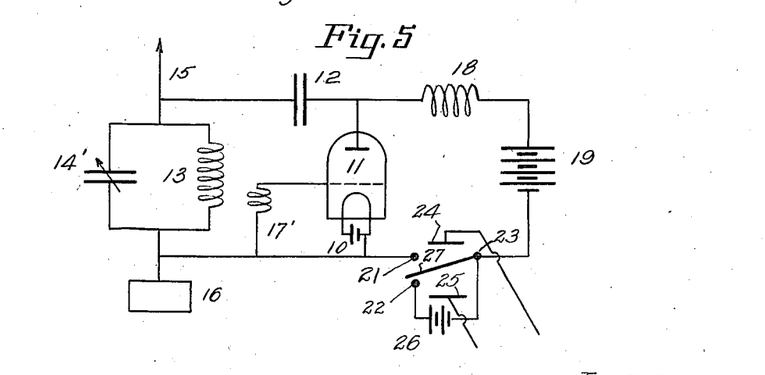
Figs. 5-7 show three other connections for producing wave emissions of short duration.
Figure 6:
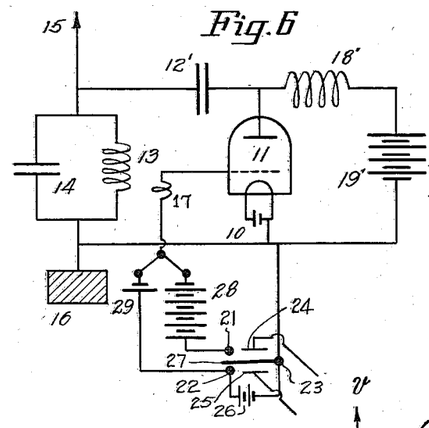
Figure 7:
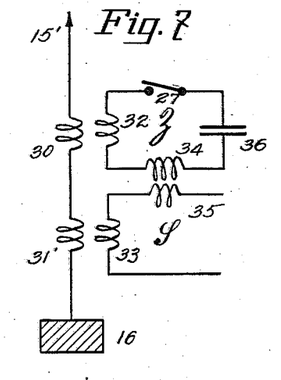

In the Figs. 5, 6 and 7 the influence upon an electron tube which serves for high frequency interruption takes place.

Fig. 5 illustrates a reversed feedback transmitter, 14' is the condenser, 13 is the coil of the wave generating circuit, 15 is the antenna, 16 is the counterpoise, 12 the blocking condenser, 17' the reversed feedback coil of the grid circuit, 11 the vacuum tube, 18 is the choke coil of the anode circuit and 19 is the anode battery.

In the high frequency interrupter 27 shown in Fig. 5 the electron ray which is normally running from the cathode 23 to the anode 21 is deviated by a transverse electric field periodically to the anode 22, whereby the anode circuit of the reversed feedback sender of Fig. 5 is alternatingly closed and opened. The deviating field which is laid on the condenser 24, 25 is produced by a modulation transmitter M, not shown in the figure.

Fig. 6 shows a reversed feedback sender or transmitter, the numerals 10 to 27 indicating parts similar to those designated by the same reference numerals in Fig. 5, (except that instead of 12, 18, 19, 14' and 17' of Fig. 5, are used 12', 18', 19', 14 and 17;) and 28 and 29 are two batteries of different voltages in the grid circuit which are switched out and switched in by the electron switch or high frequency interrupter 27 and thereby the alternating beginning and ceasing of the oscillations is obtained.

Figure 8:
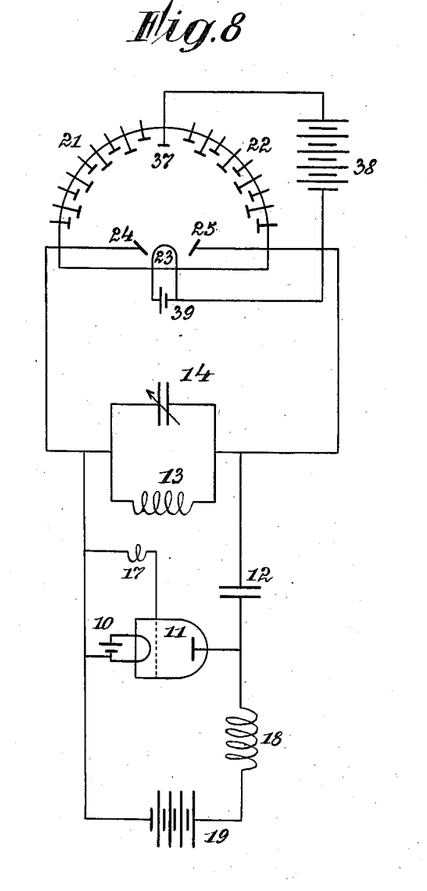
Fig. 8 shows a high frequency interrupter.

In Fig. 7 only the two coils 33 and 35 of the transmitter circuit are shown. The antenna circuit consists of the antenna 15′, the coils 30 and 31′ and the counterpoise 16, and the intermediate circuit z containing the electron switch or interrupter 27, the coils 32 and 34 and the condenser 36. The waves which are excited by the sender S in the antenna, are annihilated by the aid of this intermediate circuit Z by decoupling. As has been shown by Max Wien & N. v. Korshenswsky (Jahrbuch der drahtlosen Telegraphie vol. 19 page 356) the action of an electric wave circuit, say S, on a neighboring wave circuit, say 15′, 30, 31′, 16 may be annulled or completely compensated for by the interposition of an intermediate circuit z. The self inductions 32 and 34 and the capacity 36 of the circuit Z may be so proportioned that the oscillations or waves induced by the circuit S on the one hand directly by means of the coils 33 and 31′ and on the other hand indirectly through the medium of the intermediate circuit Z by coils 35, 34 and 32, 30 in the third circuit 15′, 30, 31′, 16 annul completely or compensate for each other by interference. By the interrupter 27 contained in the intermediate circuit Z, a periodic interruption and beginning of the decoupling and thereby the periodic beginning and ceasing of the electric oscillations is caused. Fig. 8 shows a special mode of high frequency interrupter. Opposite to the cathode 23 is a semicircular corona of anodes. The anodes are insulated from each other but overlap each other at the edges and they can be electrically combined in any suitable manner to groups of anodes. The electron ray normally directed to the central anode is deflected by the modulation voltage impressed upon the condenser plates 24, 25 more or less according to the crest value of the modulation voltage. The frequency of the modulation transmitter may be varied by means of the adjustable condenser 14 in the oscillation circuit 14, 13 of the transmitter. This oscillation circuit as shown in Fig. 8 is substantially of the same type as the transmitter circuit shown in Fig. 5 the corresponding parts being marked with the same numerals of reference.

By means of the high frequency interrupter the switching out and the switching in of the current circuits which come into consideration can be made as abruptly as required. The abruptness, that is the time within which the electron ray which possesses a certain width is sweeping over the edge of the anode, is determined by the amplitude of the deflecting field. The abruptness increases with the amplitude and the frequency of the deflecting voltage. The period of time during which the transmitter or receiver respectively is operative is determined by the number of anodes of the electron switch which anodes are in the transmitter or receiver circuit respectively. Thus as will be seen from Fig. 12 the transmitter S is operative while the electron ray of the switch 27 is sweeping the seven anodes 21 in the anode circuit of this transmitter S. Similarly the receiver E is operative while the electron of the switch 27 is sweeping over the four anodes 22 of the anode circuit of the receiver. At a given frequency the abruptness of the switching in has to be increased without a decrease of the length of the period of time during which the sender or transmitter circuit is closed, and it will be necessary to increase the number of anodes which are electrically combined to one group.

Figure 9:
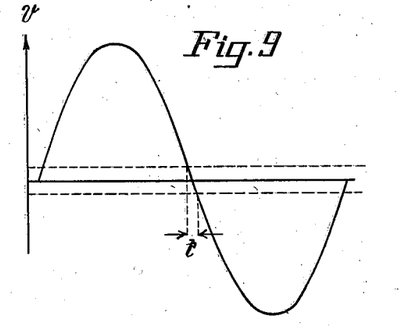
Figs. 9-11 are diagrams showing the mode of action of the high frequency interrupter.
Figure 10:
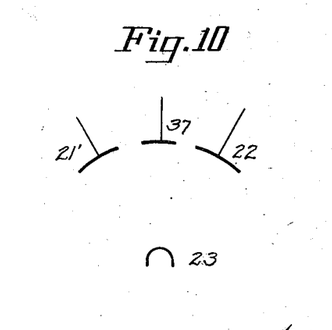
Figure 11:
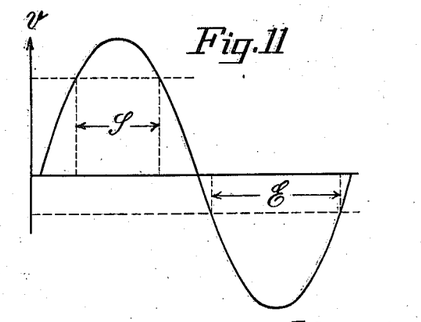

The sinuous line in Fig. 9 shows the alternating voltage V of the deviation field, the upper dotted horizontal line signifies the value of the voltage at which the anode 21 (Fig. 10) is switched in and the lower dotted horizontal line in Fig. 9 indicates the value of voltage (which may be of the same height or differing) at which the anode 22 is just switched in. The abruptness of the switching from 21 to 22 (Fig. 10) (which has however not to be confused with the abruptness of the switching in and of the switching out of the single anodes) is determined from the value of the time $t$ shown in Fig. 9. The moment at which the switching in takes place and the time during which they are switched in is determined by the mutual distance and size of the lateral anodes belonging to the corresponding current circuits respectively of the groups of anodes and may be varied within certain limits. In this way the time interval between the switching out of the one current circuit and the switching in of the other current circuit can be made of different length. The length of time during which it is switched in can also be varied for the one or the other current circuit in certain limits: It may be for instance as it is indicated in Fig. 11, made smaller for the positive half period of the deviation voltage which may be coordinated to the transmitter circuit, than for the negative half period which is coordinated to the receiver circuit. In Fig. 11 the upper dotted line corresponds to the voltage value V at which the lateral anode coordinated to the transmitter is switched in. The lower dotted line corresponds to the voltage value at which the receiver anode is switched in. As may be seen from the figure, the time interval S during which the sender is switched in is actually smaller than the interval F of the receiving time.

Figure 12:
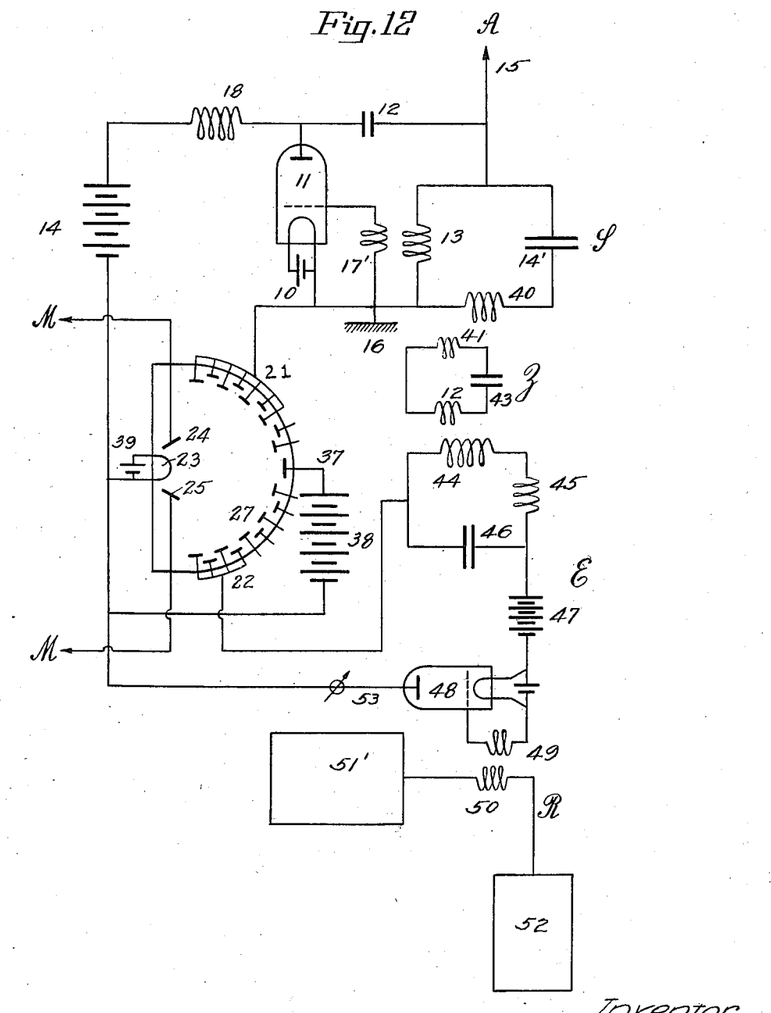
Fig. 12 shows, for the special case of Fig. 5, the complete connections for simultaneous transmitting and receiving.

Fig. 12 represents the total lay out of the connection of the transmitter and the receiver for the special case given by Fig. 5 in which the anode circuit is periodically opened and closed in the transmitter as well as in the receiver. A is the transmitting antenna, S is the transmitter, Z is the intermediate or decoupling circuit, E the receiver, R the receiver antenna and 27 the electron switch or interrupter in the sender or transmitter S and the receiver E. The transmitter S consists of the condenser 14' and the coils 13 and 40 of the wave generating circuit, the coil 17' of the grid circuit, the counter balance 16, the blocking condenser 12, the vacuum tube 11, the choke coil 18 of the anode circuit and the anode battery 14. The intermediate circuit consists of the coils 41 and 42 and the condenser 43. The receiver E comprises the oscillation circuit with the coils 44 and 45 and the condenser 46, the anode battery 47, the vacuum tube 48, the back coupling coil 49 of the grid circuit acting on the coil 50 of the symmetrical frame antenna. 51' and 52 are the two frames of the antenna. The electron switch or high frequency interrupter 27 comprises the cathode 23 the semicircular series of anodes 21, 37, 22, the battery 38 and the plates 24, 25 of the deviating condenser from which the wires M M lead to the transmitter of the modulation oscillations (not shown). The high frequency interrupter 27 is inserted into the anode circuit of the transmitter S and of the receiver E. The anodes of the interrupter 27 are arranged in Fig. 12 into groups in such a way that the sender stays within each single modulation period somewhat longer in action than the receiver and that between the cutting out of the sender and the switching in of the receiver an interval is inserted (which is determined by the damping of the oscillation circuits and by the quality of the decoupling). The condenser plates of the interrupter are connected with the oscillation circuit of the modulation sender M which is not shown in the figure. Z designates an intermediate circuit through which the receiver is freed (decoupled) from the direct influence of the sender oscillation. R is a symmetric receiving antenna which is constructed as a quadrangular rectangular antenna.

The cooperation of the transmitter or sender and the receiver is as follows: By the alternate voltage of the modulation transmitter M impressed on the plates 24, 25 of the deviating condenser the cathode current pencil normally passing along a straight line from the cathode 23 to the anode 37 is deviated upwards and downwards. While the cathode current pencil passes along the seven anodes (21 Fig. 12) the anode circuit of the transmitter is closed and this is the case in the time intervals represented by the hatched rectangles 1, 3 Fig. 1. While the cathode current pencil passes along the four anodes 22, Fig. 12 connected with each other the transmitter is cut out but the receiver is cut in, this is the case in the time intervals represented by the hatched rectangles 2, 4, Fig. 1. Thus while the transmitter operates the receiver is inoperative and vice versa; the arrangement above described therefore alternately acts as a transmitter and as a receiver. The intermediate or decoupling circuit is only used as a precaution in case that the operation of the arrangement above described should prove irregular. As has been stated in connection with the arrangement in the circuit shown in Fig. 7 the decoupling circuit may be so proportioned that the waves or oscillations of the transmitter acting directly on the receiver circuit are counterbalanced or annulled by the waves or oscillations of the transmitter acting on the receiver through the medium of the intermediate or decoupling circuit. I thus insure that even if the receiving circuit were thrown into circuit prematurely by the electron switch or interrupter 27, it is protected from the direct action of the transmitter waves.

In the circuit diagram shown by way of example in Fig. 12 for simultaneously transmitting and receiving two antennæ are used, one for transmitting and one for receiving, but a single antenna might be sufficient if the counterpoise of the transmitting antenna and the frame 51' of the receiving antenna were omitted and the connection points of the two were directly connected with each other.

The electric connections Fig. 4 and Fig. 6 are in so far analoguous as in both of them the cutting out and the switching in of the sender takes place by periodic variations of the voltage of the grid. The connection shown in Fig. 6, as well as all electric connections working with a high frequency interrupter possesses however compared with the direct sinoidal influencing of the sender tubes and the receiver tubes the important advantage that the beginning and the wiping out of the oscillation trains takes place nearly instantaneously and the efficiency losses which are caused by the gradual growing and decreasing of the oscillations can be sufficiently reduced. With high frequency interrupters, the beginning and the interruption of the oscillations can be formed as abruptly as is liked in spite of the sinoidal shape of the deviation field by increasing the amplitude of the deviation voltage.

If the modulation period is small against the time of the duration of a telegraphic Morse signal, then we possess in my described device a means for simultaneously transmitting and receiving with the same antenna.

If the arrangement has to be used as means for measuring the distance of an aereal vehicle from the earth (elevation measuring device) such a device can be improved to an automatically indicating instrument in the following way:

Let C again be the speed of propagation of electric waves and $h$ the height of the ballon or air craft above the ground, then $$t_1 = \frac{h}{C}$$

is the time required by an electric wave emanated from the transmitter to reach the ground and the same time $$t_1 = \frac{h}{C}$$

is required for the wave reflected by the ground to reach the receiver, and hence the time elapsed between the emission of a wave from the transmitter and the arrival of the reflected wave at the receiver is $$\frac{2h}{C}.$$

In order to obtain the maximum current in the ammeter 53 (Fig. 12) the time $2t_1$ must be equal to half the duration $t_2$ of a modulator oscillation $$\frac{t_2}{2} = \frac{l}{2C}$$

wherein $l$ is the wave length of the modulation wave as will be readily understood from what has been stated with reference to Figs. 1 to 3. Consequently $$2t_1 = \frac{t_2}{2}, \frac{2h}{C} = \frac{l}{2C},$$

and $4h = l$ or the oscillation wave length must be four times the height of the receiver and transmitter from the ground for obtaining the maximum current in the receiver. Whenever $l$ is different from $4h$ the current intensity in the receiver is less than the maximum value. The curve (Fig. 13) shows how this current intensity depends on the height of the balloon above the ground, the height being represented by the abscissæ and the corresponding current intensities being represented by the ordinates. The curve (Fig. 13) is obtained by preparatory experiment by measuring the current intensities of the receiver at different heights of the balloon, the modulation wave length being kept constant.

Figure 13:
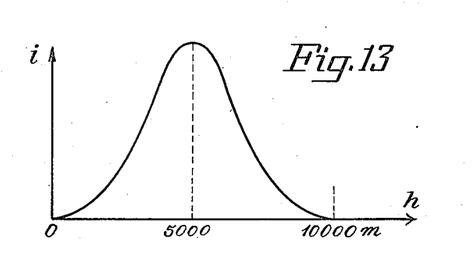
Figs. 13 and 15 illustrate the measuring method employed.

If the ammeter 53 (Fig. 12) or any other instrument for indicating the current intensity in the receiver, is provided with a scale, on which, instead of the current intensities, the corresponding heights are marked, then the observer can read these heights directly on the instrument. In Fig. 13 it is assumed that the distance covered by the transmitted wave is 10,000 metres, the constant modulation wave length is then 20,000 metres and the maximum of the current intensity in the receiver is obtained at the height of 5,000 metres above the ground.

Figure 14:
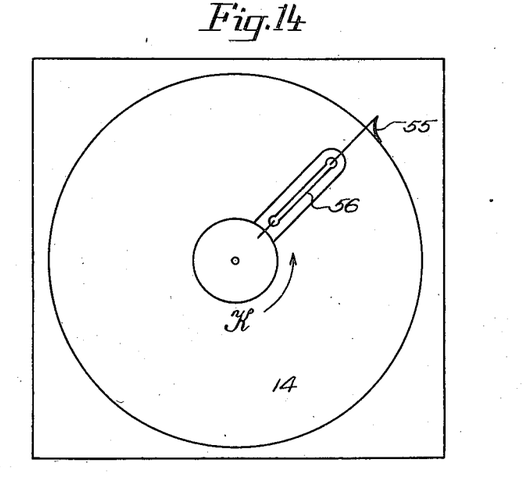
Fig. 14, shows a special form of measuring instrument for measuring distance of air craft from the earth.

For the same purpose the following arrangement may be used. The knob K, (Fig. 14) of the adjustable condenser 14 of the modulation circuit as shown in Fig. 8 is continuously revolved by some suitable motor (not shown) and carries a tube 56 containing a rare gas such as helium under low pressure. The tube 56 is included in the receiver circuit E (Fig. 12) leading from the tube 48 over to the electron switch 27 (Fig. 12) and the oscillation circuit 44, 45, 46 back to the tube 48 by suitable brushes and contact rings as shown at 54, 55, (Fig. 14). It will be understood that the helium tube 56 is in the same location and plays the same part as the ammeter 53 of Fig. 12. The gas pressure in the helium tube is so selected that, when the current intensity in the said anode circuit is a maximum, current will pass through the tube 56. Now the adjustment of the adjustable condenser 14 and hence also the frequency of the modulation oscillation vary periodically as the adjusting knob K of this condenser 14 continuously revolves. Consequently the tube 56 will be lighted in that of its positions and of the knob K in which the wave length $l$ of the modulation circuit is four times the height $h$ of the balloon above the ground as above explained and therefore the position of the helium tube 56 in which it is lighted in each revolution indicates the wave length $l$ and the height $h$ so that the helium tube 56 serves as a luminous pointer on a dial from which, if properly divided, the height $h$ can be directly read.

Figure 15:
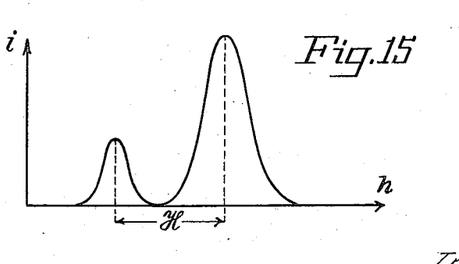

In deserts and other arid regions electric waves will be weakly reflected by the dry surface of the ground and more powerfully by underground reflecting strata either of water or other conductive material. This double reflection will manifest itself as illustrated by the graph of Fig. 15 in which the heights $h$ of the balloon or air craft above the ground are plotted as abscissæ and the current intensities $i$ as ordinates. From this graph it will be seen that as the wave length to which the modulator is adjusted is gradually increased, the height above the ground being kept unaltered, the current intensity indicated by the ammeter 53 first reaches a maximum corresponding to the actual height of the source of electric waves above the ground and due to the reflection of the electric waves on the dry or non-conductive ground. On further increasing the modulation wave length the said current intensity first decreases more or less markedly and then rises again to reach a second, much greater maximum, which is due to the reflection of the electric waves on the conductive underground layer, and the difference of modulation wave lengths, for the two maxima of current intensity corresponds with an apparent difference H, Fig. 15, of two heights of the source of electric waves above the ground, and this difference H represents the depth of the conductive layer below the dry, non-conductive surface of the ground.

The described means permit of the following practical use:

(1) The determination of the height of a flying body above the earth.

(2) The determination of the depth of ore deposits and of ground water in arid regions.

What I claim is:

1. In an apparatus for determining the distance between a source of electric waves and an electrically conductive surface capable of reflecting the said waves, the combination of the said source of electric waves with means for intermittently throwing said source into and out of operation, such means comprising a modulation transmitter cooperating with the wave emitting source for intermittently throwing the latter source into and out of operation, the duration of the emissions being substantially equal to the time intervals between successive emissions and the frequency of the modulator oscillation being equal to the frequency of said emissions of wave groups, a quantitative receiver located in close proximity to the said source and adapted to receive the waves reflected from the conductive surface, means for throwing out of and into action the said receiver substantially at the instant when the wave emission from the said source commences and ceases respectively and means for adjusting the frequency of the modulation transmitter.

2. In an apparatus for determining the distance between a source of electric waves and an electrically conductive surface capable of reflecting such waves, the combination of a wave emitting circuit, a modulation circuit, the frequency of the modulator oscillation being equal to the frequency of said emissions of wave groups, means cooperating with the wave emitting circuit and the modulation circuit for throwing out of action the wave emitting circuit for substantially halves of oscillations of one direction and throwing into action the wave emitting circuit for substantially halves of oscillations of the other direction, a quantitative receiver located in close proximity to the wave emitting circuit and adapted to receive the waves reflected from the conductive surface, a decoupling circuit cooperating with the wave emitting circuit and the said quantitative receiver for preventing the waves emitted from the wave emitting circuit from directly acting on the said receiver, means for throwing out of and into action the said receiver substantially at the instant when the wave emission from the said source commences and ceases respectively and means for adjusting the frequency of the oscillation of the modulation circuit.

3. In an apparatus for determining the distance between a source of electric waves and an electrically conductive surface capable of reflecting the said waves, the combination of the said source of electric waves with means for intermittently throwing said source into and out of operation, such means comprising a modulation transmitter cooperating with the wave emitting source for intermittently throwing the latter source into and out of operation, the duration of the emissions being substantially equal to the time intervals between successive emissions and the frequency of the modulator oscillation being equal to the frequency of said emissions of wave groups, means for limiting the periods during which the wave emitting source is thrown into and out of operation to parts of the oscillations in proximity to their crests, a quantitative receiver located in close proximity to the said source and adapted to receive the waves reflected from the conductive surface, means for preventing the wave emitting source from directly acting on the said quantitative receiver, means for throwing out of and into action the said receiver substantially at the instant when the wave emission from the said source commences and ceases respectively and means for adjusting the frequency of the modulation transmitter.

4. In an apparatus for determining the distance between a source of electric waves and an electrically conductive surface capable of reflecting such waves, the combination of a wave emitting circuit, a modulation circuit the frequency of the modulator oscillation being equal to the frequency of said emissions of wave groups, a quantitative receiver located in close proximity to the wave emitting circuit and adapted to receive the waves reflected from the conductive surface, a decoupling circuit cooperating with the wave emitting circuit and the said quantitative receiver for preventing the waves emitted from the wave emitting circuit from directly acting on the said receiver, and means for adjusting the frequency of the oscillation of the modulation circuit and a switch responding to the opposite directions of the halves of the modulation oscillations such switch throwing into action the wave emitting circuit and throwing out of action the said quantitative receiver for substantially one half of each oscillation and throwing out of action the wave emitting circuit and throwing into action the said quantitative receiver for substantially the other halves of the modulation oscillations.

5. In an apparatus for determining the distance between a source of electric waves and an electrically conductive surface capable of reflecting such waves, the combination of a wave emitting circuit, a modulation circuit the frequency of the modulator oscillation being equal to the frequency of said emissions of wave groups, a quantitative receiver located in close proximity to the wave emitting circuit and adapted to receive the waves reflected from the conductive surface, a decoupling circuit cooperating with the wave emitting circuit and the said quantitative receiver for preventing the waves emitted from the wave emitting circuit from directly acting on the said receiver and means for adjusting the frequency of the oscillation of the modulation circuit, and a switch comprising a vacuum chamber provided with a anode and a cathode connected to opposite terminals of a constant source of electricity, conductive plates located on opposite sides of the cathode of the said vacuum chamber and electrodes on opposite sides of the anode of the said vacuum chamber one of such electrodes being connected to the wave emitting circuit and the other of such electrodes being connected to the said quantitative receiver.

6. In an apparatus for determining the distance between a source of electric waves and an electrically conductive surface capable of reflecting such waves, the combination of a wave emitting circuit, a modulation circuit the frequency of the modulator oscillation being equal to the frequency of said emissions of wave groups, a quantitative receiver located in close proximity to the wave emitting circuit and adapted to receive the waves reflected from the conductive surface, a decoupling circuit cooperating with the wave emitting circuit and the said quantitative receiver for preventing the waves emitted from the wave emitting circuit for directly acting on the said receiver, and means for adjusting the frequency of the oscillation of the modulation circuit, and a switch comprising a vacuum chamber provided with an anode and a cathode connected to opposite terminals of a constant source of electricity, conductive plates located on opposite sides of the cathode of the said vacuum chamber and electrodes on opposite sides of the anode of the said vacuum chamber, one of such electrodes being connected to the said quantitative receiver, each of the said electrodes comprising a plurality of plates located in close proximity to each other and means for varying the number of such plates connected to the wave emitting circuit and to the receiver respectively.

7. In an apparatus for determining the distance between a source of electric waves and an electrically conductive surface capable of reflecting such waves, the combination of a wave emitting circuit, a modulation circuit the frequency of the modulator oscillation being equal to the frequency of said emissions of wave groups, a quantitative receiver located in close proximity to the wave emitting circuit and adapted to receive the waves reflected from the conductive surface, a decoupling circuit cooperating with the wave emitting circuit and the said quantitative receiver for preventing the waves emitted from the wave emitting circuit from directly acting on the said receiver, and means for adjusting the frequency of the oscillation of the modulation circuit, and a switch comprising a vacuum chamber provided with an anode and a cathode connected to opposite terminals of a constant source of electricity, conductive plates located on opposite sides of the cathode of the said vacuum chamber and electrodes on opposite sides of the anode of the said vacuum chamber one of such electrodes being connected to the wave emitting circuit and the other of such electrodes being connected to the said quantitative receiver, each of the said electrodes comprising a plurality of plates located in close proximity to each other and overlapping each other, and means for varying the number of such plates connected to the wave emitting circuit and to the receiver respectively.

In testimony whereof I have signed my name to this specification.

DR. HEINRICH LÖWY.